June 5, 1951      W. L. FISCHER      2,555,637
YIELDABLE SUPPORT

Filed Sept. 25, 1946      2 Sheets-Sheet 1

INVENTOR
WILLIAM L. FISCHER
BY
S. C. Yeaton
ATTORNEY

June 5, 1951 W. L. FISCHER 2,555,637
YIELDABLE SUPPORT

Filed Sept. 25, 1946 2 Sheets-Sheet 2

INVENTOR
WILLIAM L FISCHER
BY
S. C. Yeaton
ATTORNEY

Patented June 5, 1951

2,555,637

UNITED STATES PATENT OFFICE 2,555,637

YIELDABLE SUPPORT

William L. Fischer, Schenectady, N. Y., assignor to American Locomotive Company, New York, N. Y., a corporation of New York Application September 25, 1946, Serial No. 699,263

3 Claims. (Cl. 308—26)

This invention relates to yieldable supports.

The invention has particular reference to a support of the hollow pillow-block type adapted to yieldably support a load wherein a plurality of leaf springs co-operate with a plurality of supporting surfaces therefor in such manner that the vibration characteristics of the leaf springs change as a function of the deflection thereof.

The invention has further reference to a support of the pillow-block type having a substantially rectangular chamber internally thereof whose wall surfaces are faced with stacks of leaf springs disposed in laterally spaced pairs at right angles to each other, with the intermediate portion of each wall surface spaced from its correlated leaf spring to provide separately yieldable surfaces defining a rectangular opening axially of and within the support for the reception of a tubular element in co-operative relation therewith.

An object of the invention is to provide a yieldable all-metal support which is of simple construction, small in size and adapted for yieldably supporting substantial loads.

Another object is to provide a yieldable, vibration-damping support, as aforesaid, which is particularly adapted for use as a trunnion carriage or cradle for supporting or pivotally supporting, for example, small engines, pumps, water-cooling radiators and the like.

A further object is to provide a yieldable, vibration-damping support which is not affected by high or low temperatures, oil, water or other substances harmful to non-metallic damping materials such as rubber, for example, and which will retain maximum resiliency over long periods of use.

Figure 1:
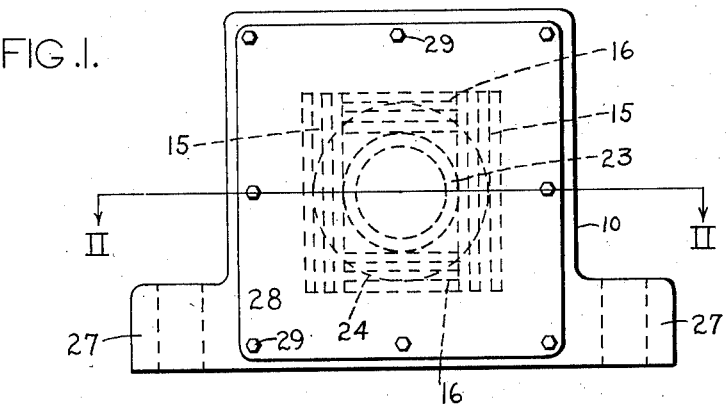
Figure 4:
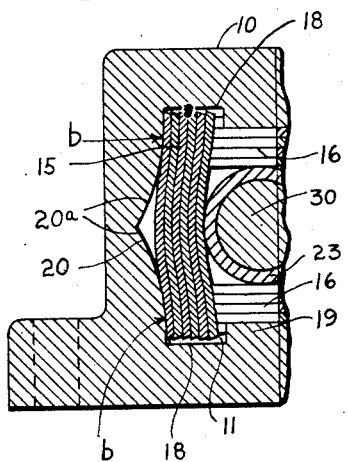

With the above and other objects in view, the invention resides in the novel construction, combination and arrangements of parts, the novel features of which are set forth with particularity in the appended claims, the invention itself, however, both as to its organization and operation, together with additional objects and advantages thereof, being best understood from the following description of a specific embodiment when taken in connection with the accompanying drawings, in which:

Figure 1 is a view, in elevation, of a device embodying the present invention; Fig. 1 is a sectional view on the line II—II of Fig. 1, parts being shown in full and a supported structure shown fragmentally; Fig. 3 is a sectional view taken on the line III—III of Fig. 2; Fig. 4 is a view similar to the left half of Fig. 3 but slightly exaggerated to best show one pack of leaf springs in deflected position; and Fig. 5 is a perspective view of a half section of the pillow-block forming a part of the device of Fig. 1.

Referring to the drawings, a yieldable vibration-damping support, constructed in accordance with this invention as shown, is preferably, although not necessarily, of the one-piece pillow-block type, and will be so described by way of example.

Figure 5:
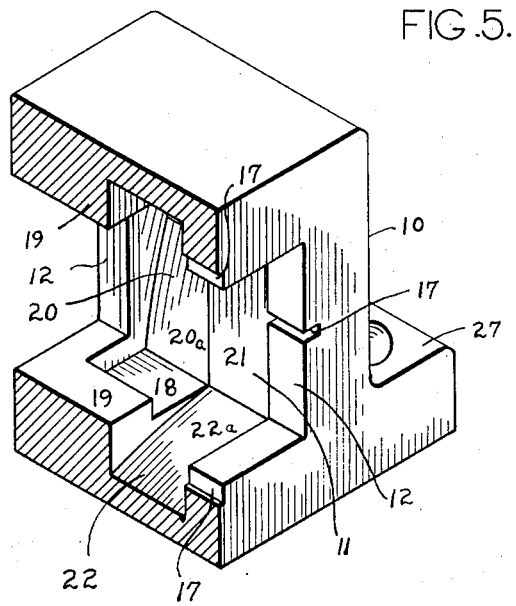

In accordance with the invention, the support includes a one-piece pillow-block 10 having a substantially rectangular or prismatic interior chamber 11 which opens outwardly of the pillow-block 10 through relatively small rectangular opposite end openings 12 formed in the front and rear walls 13 and 14 thereof, the center of the chamber 11 and the end openings 12 being in axial alignment, the openings 12 being relatively smaller than the chamber 11 so that portions of the walls 13 and 14 overlap the chamber 11, as is clearly shown in Fig. 5.

Figure 2:
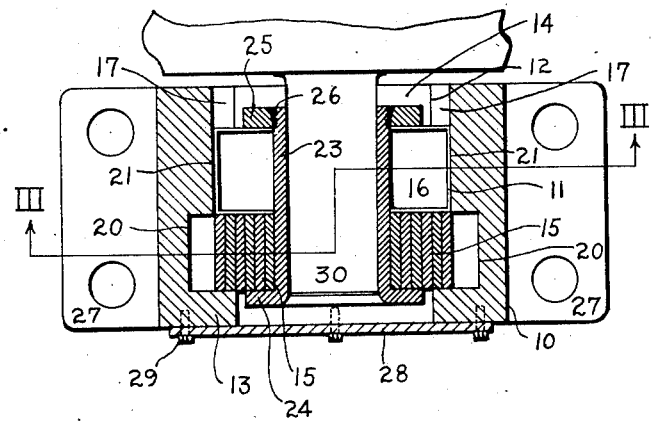
Figure 3:
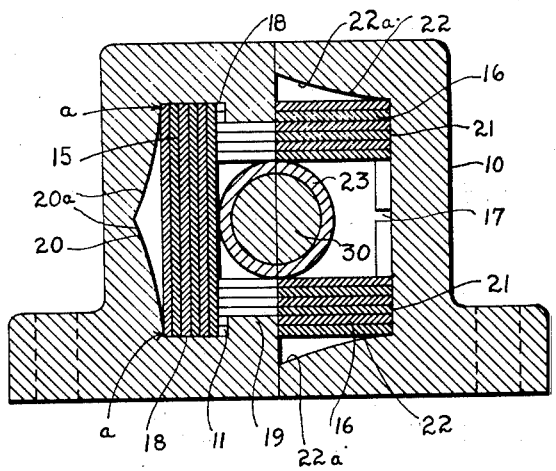

Further in accordance with the invention, the front or lowermost half of the chamber 11, as seen in Fig. 2, houses two oppositely spaced, vertically disposed packs of leaf springs 15, and the remaining half of the chamber 11 houses two similar packs of leaf springs 16 which are also oppositely disposed but in a horizontal plane or normal to the aforesaid packs of leaf springs 15 and in laterally spaced relation thereto as clearly shown in Fig. 2.

The packs of leaf springs 15 and 16 each comprise a plurality of separate leaves which are stacked in superposed relation in their respective positions within the chamber 11 by inserting each leaf edgewise through the end opening 12 of the rear wall 14 which is provided with a plurality of rectangular slots 17 inwardly of its edges to permit passage of the spring leaves therethrough, when a pillow-block of the one-piece type is utilized. The bottom leaf spring pack supports the dead weight load of the supported structure and therefore it will necessarily be stronger than the other leaf spring packs. The individual leaves may be curved when unloaded and become straight when in normal operative position, as will presently appear, and the slots 17 are wide enough to admit such curved leaves.

The wall surfaces defining the front half of the chamber 11 housing the packs of leaf springs 15 comprise upper and lower horizontal surfaces 18, each defining an intermediate shouldered portion or boss 19 between, but spaced from, the adjacent opposite end portions of the packs of leaf springs 15; and opposite side wall surfaces 20 substantially normal to the surfaces 18. Similarly, the wall surfaces defining the remaining half of the chamber 11 housing the packs of leaf springs 16, comprise vertically disposed opposite side walls 21 and upper and lower wall surfaces 22 substantially normal thereto. The aforesaid wall surfaces 18 and 21 are flat whereas the wall surfaces 20 and 22 each constitutes a pair of curved surfaces 20a and 22a respectively, and each pair converges outwardly from the opposite ends of its correlated pack of leaf springs, each of the aforesaid curved surfaces being convex about a horizontal axis so that the end portions of the outer face of each of the adjacent leaf springs seat substantially tangentially on a curved surface. Thus, a clearance space is provided between the outer face of each outer leaf spring and the juncture of the curved surfaces 20a or 22a, as the case may be, adjacent thereto, to permit bending of each pack of leaf springs about its points of engagement with the outer ends of the curved surfaces, the points of engagement being indicated at $a$ in Fig. 3, and of deflected leaf springs at $b$ in Fig. 4.

The bosses 19 help to hold the pack of leaf springs 15 in spaced relation during assembly. There are no bosses 19 between the packs of leaf springs 16.

In the bending or flexing of the packs of leaf springs 15 and 16 about their points of engagement with the end portions of the curved surfaces 20a and 22a, these points of engagement shift toward the juncture of the curved surfaces as each pack of leaf springs is deflected, and away from the juncture as each pack of leaf springs returns to its normal position. Thus, it will be apparent that the vibration-damping characteristics of the packs of leaf springs change as a function of the deflection thereof, the effective length of each pack of leaf springs shortening as it is compressed.

From the above, it will be clear that the aforesaid shift in the points of engagement between the packs of leaf springs and their correlated curved surfaces 20a and 22a, creates a quick stiffening effect and a change in the natural frequency of the packs of leaf springs which is desirable to avoid a dangerous resonance condition coupled with a damping due to friction between adjacent leaves.

As clearly shown in Fig. 2, a tubular bushing or sleeve 23 having a flange 24 formed on one end thereof, is journalled on and between the respective packs of leaf springs 15 and 16 with the flange 24 substantially in abutment with the packs of leaf springs 15. The sleeve 23 is retained in its journalled position by a suitable ring nut 25 screw-threaded on the opposite end of the sleeve 23 substantially in abutment with the packs of leaf springs 16, and the nut 25 is locked in adjusted position thereon by an outer surface weld between the nut and sleeve, as indicated at 26. The distance between the flange 24 and nut 25 is greater than the combined width of a spring 15 and a spring 16 so that the packs of leaf springs 15 and 16 can be in slightly spaced relation as is clearly shown in Fig. 2. The sleeve 23 spreads the packs of leaf springs apart so that the packs of leaf springs, which may be curved when unloaded, are straightened up as shown, and exert forces upon the sleeve yieldingly resisting its movement. The characteristics of the packs of leaf springs can be adjusted by the choice of leaves used. Where stronger packs of leaf springs are needed, leaves can be added, or thicker leaves can be used, or leaves having greater initial curvature may be chosen.

The pillow-block 10 is further provided with integral, oppositely extending apertured flanges 27 parallel with the bottom face thereof whereby the support may be secured to a suitable supporting surface by means of bolts, in known manner, (not shown).

To preclude the entry of dirt and other foreign particles into the chamber 11 from its front side, a closure plate 28 is preferably detachably secured to the front side of the pillow-block 10 by means of suitable tap bolts 29, as is clearly shown in Figs. 1 and 2. The opposite side may have a flexible seal (not shown) not interfering with the motion of the sleeve 23 or the member supported therein.

From the foregoing it will be clear to those skilled in the art that the present invention provides a simple, reliable support adapted to pivotally receive supporting trunnions, pintles, stub shafts and the like, as indicated, for example, by the reference character 30, in a yieldable, vibration-damping manner, the yieldable characteristic being provided in any direction by the four packs of leaf springs and the damping characteristics being due to the friction between the leaves of the packs. While only one pillow-block support has been shown, ordinarily two spaced supports will be used together, as to support opposite trunnions on the sides of a radiator.

While a preferred embodiment of the present invention has been illustrated and described, it is to be expressly understood that modifications thereof are possible. This invention, therefore, is not to be restricted except insofar as it is necessitated by the prior art and by the scope of the appended claims.

The invention claimed and desired to be secured by Letters Patent is:

1. A support for a load comprising a hollow block having an interior rectangular chamber; two spaced vertical packs of leaf springs disposed in one-half of the chamber; two spaced horizontal packs of leaf springs disposed in the other half of the chamber; and a member disposed in the spaces between the packs, each of the packs normally pressing against the member to hold it in central position whereby movement of the member toward any one of the packs is yieldingly resisted and dampened by friction developed between the leaves of the packs during their reflection, the portion of the chamber-defining wall opposite the outer face of each of the packs having two parts converging outwardly away from the opposite ends of the adjacent back and curving convexly about a horizontal axis thereby to provide a space permitting deflection of the adjacent pack.

2. A support for a load comprising a hollow block having an interior rectangular chamber; two spaced vertical packs of leaf springs disposed in one-half of the chamber; two spaced horizontal packs of leaf springs disposed in the other half of the chamber; and a member disposed in the spaces between the packs, each of the packs normally pressing against the member to hold it in central position whereby movement of the member toward any one of the packs is yieldingly resisted and dampened by friction developed between the leaves of the packs during their deflection, the portion of the chamber-defining wall opposite the outer face of each of the packs having two parts converging outwardly away from the opposite ends of the adjacent back and curving convexly about a horizontal axis thereby to provide a space permitting deflection of the adjacent pack, each of the packs, when undeflected, engaging the adjacent wall parts substantially tangentially at its ends, the points of engagement of each pack moving together during deflection of the pack, whereby the effective length thereof is shortened and the natural frequency thereof is changed.

3. A support for a load comprising a block having an inner chamber; a member disposed horizontally in the chamber for supporting the load, the chamber having two vertical walls on opposite sides of the member, and two horizontal walls offset from the vertical walls and on opposite sides of the member, each of the walls having two portions converging outwardly from their opposite ends away from the member, and curving about a horizontal axis; and a pack of leaf springs compressed between each of the walls and the member, each of the packs engaging its chamber wall at its end portions only and engaging the said member at its center portion only whereby movement of the member toward any one of the packs is yieldingly resisted and dampened by the inherent spring friction, the point of juncture of the two portions of each wall being spaced from the adjacent pack of leaf springs thereby permitting deflection of the same and the points of engagement of each of the packs, with its correlated wall, changes during deflection, thereby shortening its effective length and changing its natural frequency.

WILLIAM L. FISCHER.

REFERENCES CITED

The following references are of record in the file of this patent:

UNITED STATES PATENTS

| Number | Name | Date |
|---|---|---|
| 1,962,993 | Leece | June 12, 1934 |
| 1,967,052 | Dumm | July 17, 1934 |
| 2,012,997 | Junkers | Sept. 3, 1935 |
| 2,239,867 | Weckstein | Apr. 29, 1941 |

FOREIGN PATENTS

| Number | Country | Date |
|---|---|---|
| 214,298 | Great Britain | 1924 |
| 655,577 | France | 1928 |